United States Patent
Batra et al.

(10) Patent No.: US 11,704,848 B2
(45) Date of Patent: Jul. 18, 2023

(54) SYSTEMS FOR GENERATING STROKED PATHS

(71) Applicant: Adobe Inc., San Jose, CA (US)

(72) Inventors: Vineet Batra, Pitam Pura (IN); Praveen Kumar Dhanuka, Howrah (IN); Ankit Phogat, Noida (IN)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 17/504,814

(22) Filed: Oct. 19, 2021

(65) Prior Publication Data
US 2023/0117487 A1   Apr. 20, 2023

(51) Int. Cl.
| | |
|---|---|
| *G06T 11/20* | (2006.01) |
| *G06T 11/40* | (2006.01) |
| *G06V 30/32* | (2022.01) |

(52) U.S. Cl.
CPC ........... *G06T 11/203* (2013.01); *G06T 11/40* (2013.01); *G06V 30/347* (2022.01)

(58) Field of Classification Search
CPC ...... G06T 11/203; G06T 11/40; G06V 30/347
See application file for complete search history.

(56) References Cited

U.S. PATENT DOCUMENTS

| | | | |
|---|---|---|---|
| 6,804,573 B2 * | 10/2004 | Goldman | D05B 19/08 700/137 |
| 8,674,995 B1 * | 3/2014 | Asente | G06T 11/203 700/165 |
| 9,200,397 B2 * | 12/2015 | Goldman | D05B 19/08 |
| 10,482,622 B2 | 11/2019 | Worthington | |
| 10,832,446 B2 | 11/2020 | Phogat et al. | |
| 11,164,343 B1 | 11/2021 | Batra et al. | |
| 11,651,536 B2 | 5/2023 | Batra et al. | |
| 2005/0168476 A1 | 8/2005 | Levene et al. | |
| 2008/0252645 A1 * | 10/2008 | Mouilleseaux | G06F 3/04845 345/442 |
| 2011/0175916 A1 * | 7/2011 | Noris | G06V 10/469 345/441 |
| 2011/0216976 A1 | 9/2011 | Rother et al. | |

(Continued)

FOREIGN PATENT DOCUMENTS

CN    102538706 A    7/2012

OTHER PUBLICATIONS

"Document management—Portable document format—Part1: PDF1.7 First Edition", Adobe Systems Incorporated [retrievedAug. 17, 2021], Retrieved from the Internet., Jul. 1, 2008, 756Pages (Year: 2008).*

(Continued)

*Primary Examiner* — Michael Le
(74) *Attorney, Agent, or Firm* — FIG. 1 Patents

(57) ABSTRACT

In implementations of systems for generating stroked paths, a computing device implements a stroked path system to receive input data describing a vector object having a filled path. The stroked path system generates a medial axis for the filled path by performing a medial axis transform on a boundary of the filled path. A stroke width is estimated based on distances between the medial axis and the boundary of the filled path that are normal to the medial axis. The stroked path system generates a stroked path for display in a user interface that is visually similar to the filled path based on the medial axis and the stroke width.

20 Claims, 15 Drawing Sheets

(56) References Cited

U.S. PATENT DOCUMENTS

| | | | |
|---|---|---|---|
| 2013/0120426 A1 | 5/2013 | Diverdi | |
| 2015/0371417 A1* | 12/2015 | Angelov | G06V 30/347 |
| | | | 345/442 |
| 2015/0378450 A1* | 12/2015 | Petkov | G06T 11/203 |
| | | | 345/442 |
| 2016/0350942 A1 | 12/2016 | Asente et al. | |
| 2017/0221253 A1* | 8/2017 | Banerjee | G06T 11/001 |
| 2017/0372455 A1 | 12/2017 | Winneemoeller et al. | |
| 2018/0285638 A1* | 10/2018 | Lelore | G06V 30/1423 |
| 2018/0322612 A1 | 11/2018 | Asente et al. | |
| 2021/0271474 A1 | 9/2021 | Batra et al. | |
| 2023/0100830 A1 | 3/2023 | Batra et al. | |

OTHER PUBLICATIONS

"Document management—Portable document format—Part 1: PDF 1.7 First Edition", Adobe Systems Incorporated [retrieved Aug. 17, 2021], Retrieved from the Internet <https://www.adobe.com/content/dam/acom/en/devnet/pdf/pdfs/PDF32000_2008.pdf>., Jul. 1, 2008, 756 Pages.

Batra, Vineet et al., "U.S. Application as Filed", U.S. Appl. No. 17/476,834, filed Sep. 16, 2021, 49 pages.

Blum, Harry et al., "Shape description using weighted symmetric axis features", Pattern Recognition, vol. 10, No. 3 [retrieved Aug. 17, 2021], Retrieved from the Internet <http://www.sci.utah.edu/~gerig/CS7960-S2010/handouts/shapedescriptors_blum.pdf>., 1978, 17 Pages.

Brandt, Jonathan W., "Theory and application of the skeleton representation of continuous shapes", Doctoral dissertation, University of California, Davis, Division of Computer Science 4455 Chem. Annex Davis, CA, United States [retrieved Oct. 20, 2021], UMI Order No. GAX92-17565, 1992, 219 pages.

Choi, Hyeong In et al., "Mathematical theory of medial axis transform", Pacific Journal of Mathematics vol. 181, No. 1 [retrieved Aug. 17, 2021], Retrieved from the Internet <https://msp.org/pjm/1997/181-1/pjm-v181-n1-p02-p.pdf>., Nov. 1997, 32 Pages.

Choi, Hyeong In et al., "New Algorithm for Medial Axis Transform of Plane Domain", Graphical Models and Image Processing, vol. 59, No. 6 [retrieved Oct. 6, 2021], Retrieved from the Internet <https://doi.org/10.1006/gmip.1997.0444>., Nov. 1997, 21 pages.

Lee, D. T., "Medial Axis Transformation of a Planar Shape", IEEE Transactions on Pattern Analysis and Machine Intelligence, vol. PAMI-4, No. 4 [retrieved Aug. 17, 2021], Retrieved from the Internet <https://doi.org/10.1109/TPAMI.1982.4767267>., Jul. 1982, 7 Pages.

Schneider, Philip J., "Solving the nearest-point-on-curve problem", in: Philip J. Schneider, Graphics Gems, Academic Press Inc., Massachusetts [retrieved Aug. 17, 2021], Retrieved from the Internet <http://inis.jinr.ru/sl/vol1/CMC/Graphics_Gems_1,ed_A.Glassner.pdf>., Aug. 1990, pp. 607-611.

Shewchuk, Jonathan R., "Triangle: Engineering a 2D Quality Mesh Generator and Delaunay Triangulator", Workshop on Applied Computational Geometry. Springer, Berlin [retrieved Apr. 13, 2021], Retrieved from the Internet <https://doi.org/10.1007/BFb0014497>., May 1996, 10 pages.

U.S. Appl. No. 17/476,834, "Non-Final Office Action", U.S. Appl. No. 17/476,834, dated Aug. 30, 2022, 10 pages.

U.S. Appl. No. 17/476,834, "Corrected Notice of Allowability", U.S. Appl. No. 17/476,834, dated Feb. 2, 2023, 2 pages.

U.S. Appl. No. 17/476,834, "Corrected Notice of Allowability", U.S. Appl. No. 17/476,834, dated Mar. 30, 2023, 2 pages.

U.S. Appl. No. 17/476,834, "Notice of Allowance", U.S. Appl. No. 17/476,834, dated Jan. 19, 2023, 8 pages.

* cited by examiner

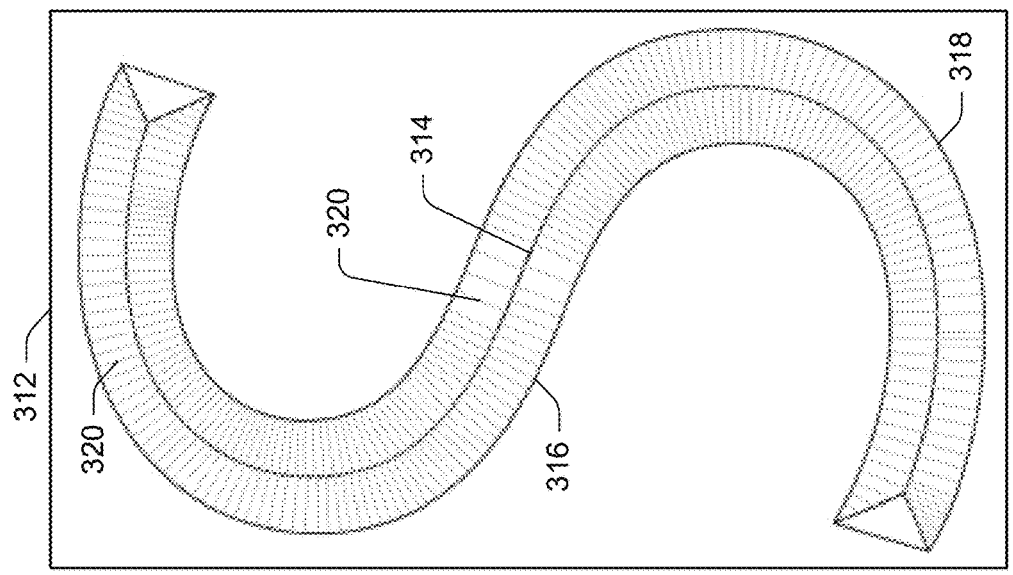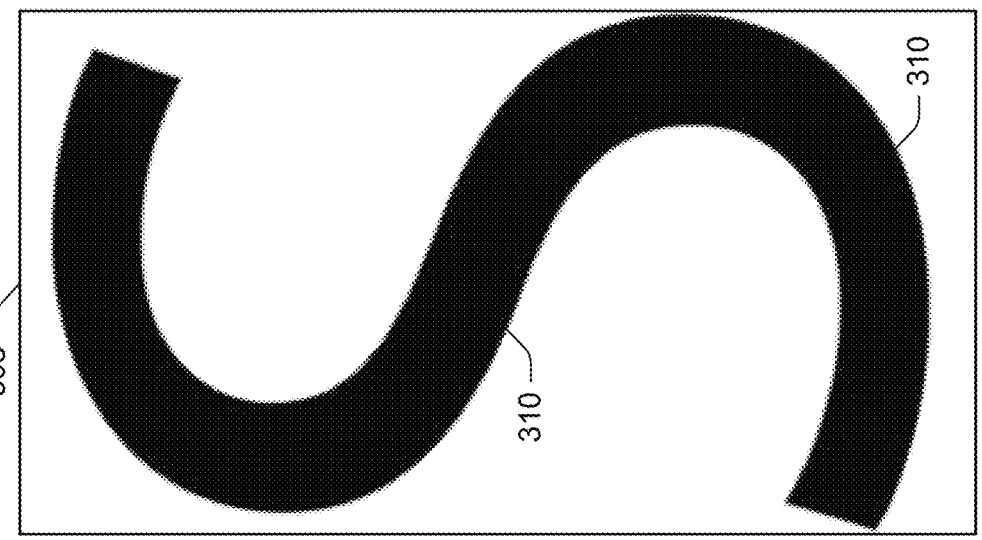
Fig. 3A

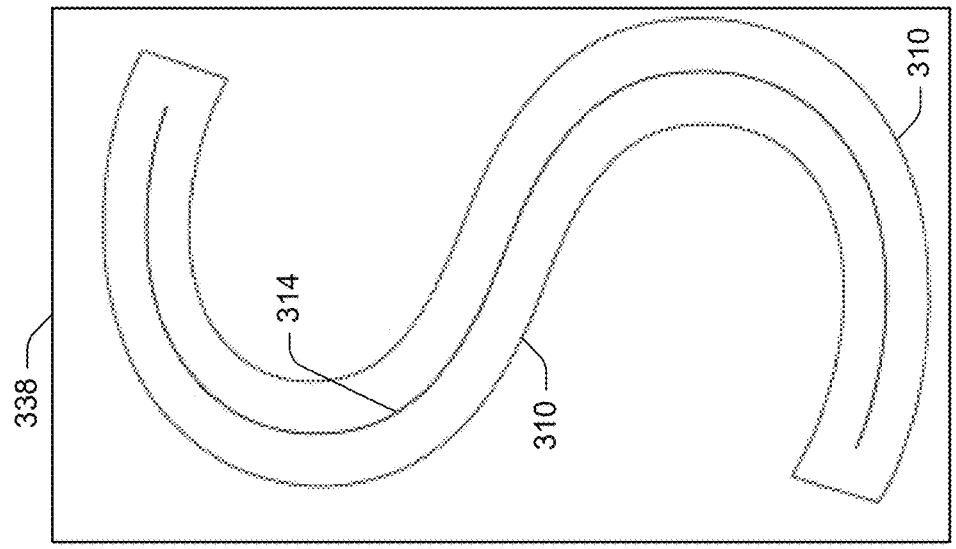
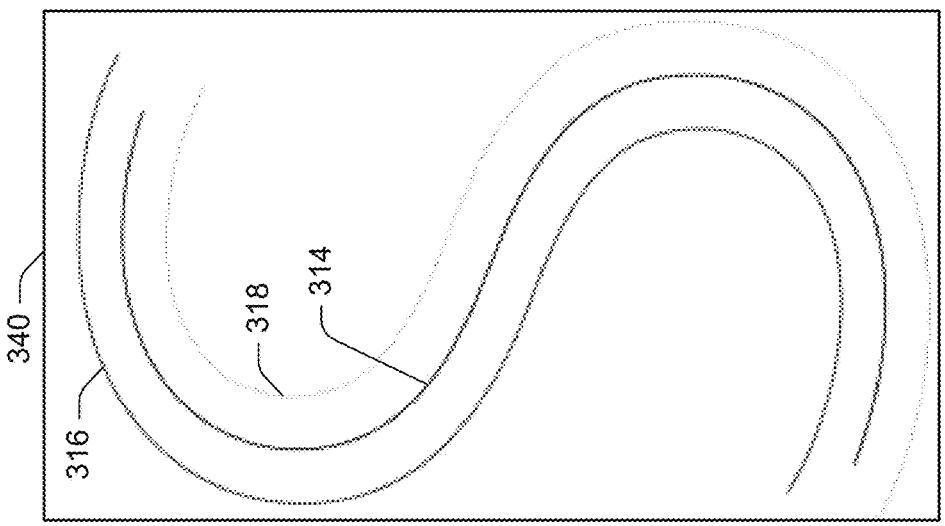
Fig. 3C

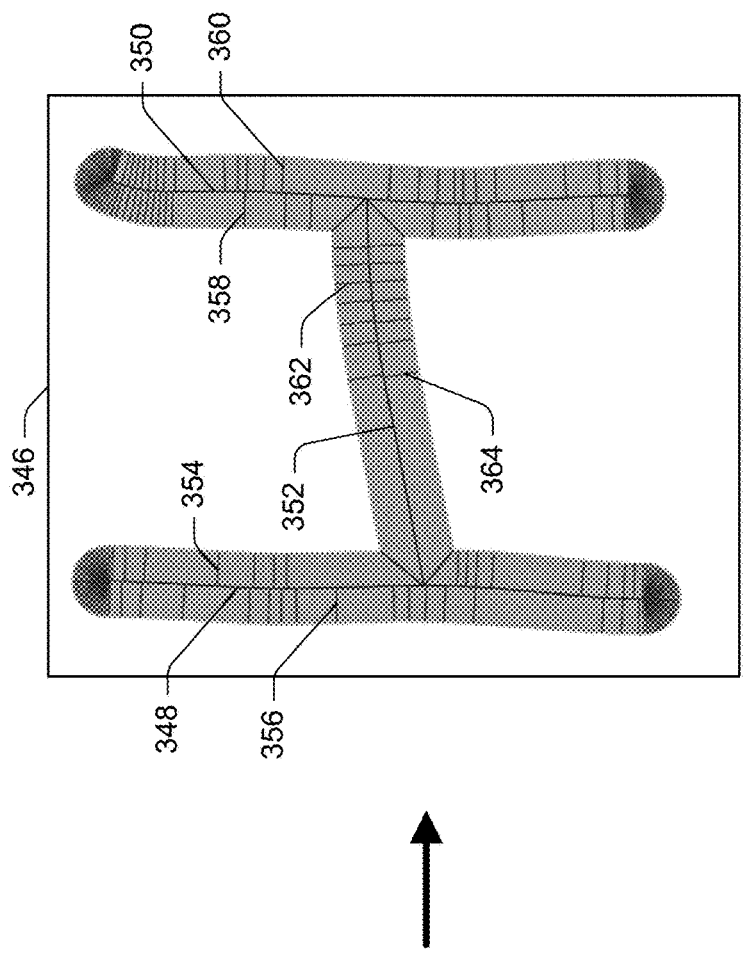
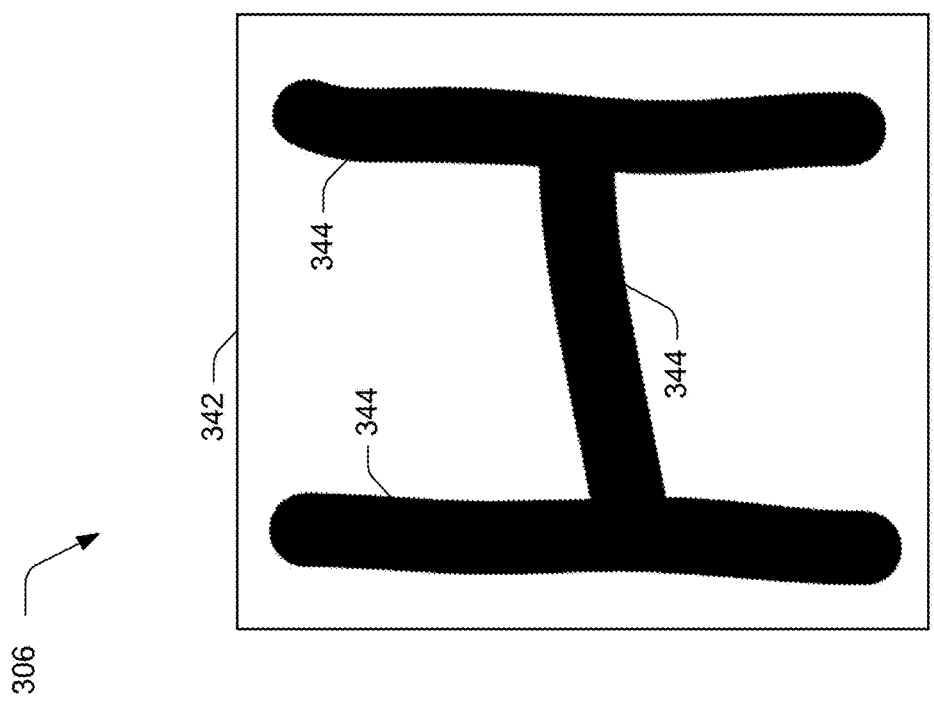
Fig. 5D

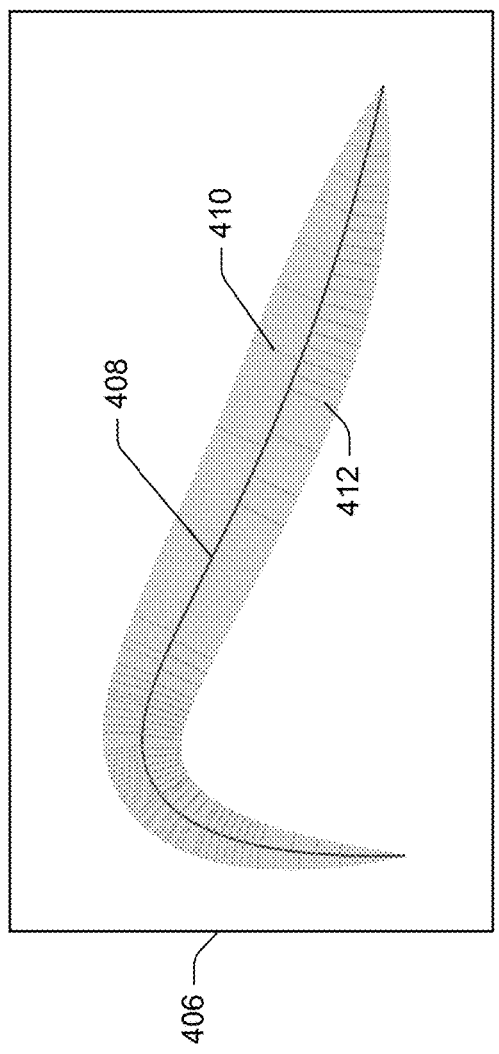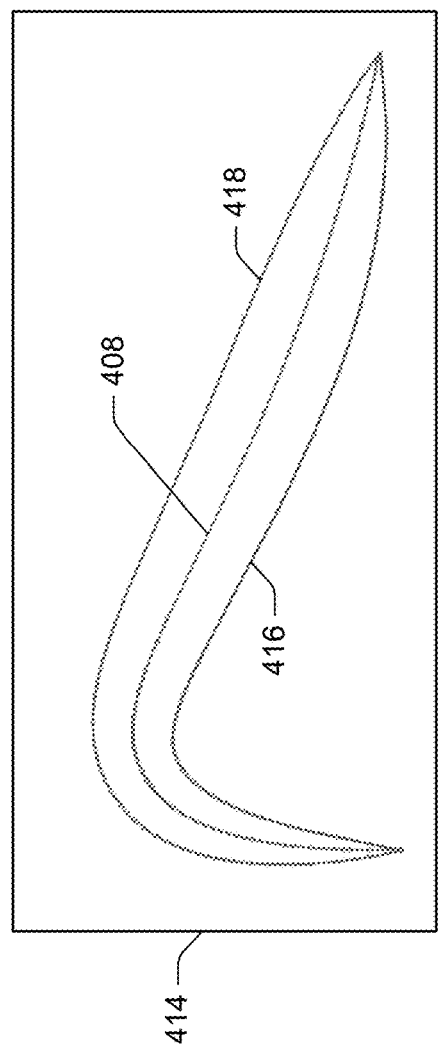
Fig. 4A

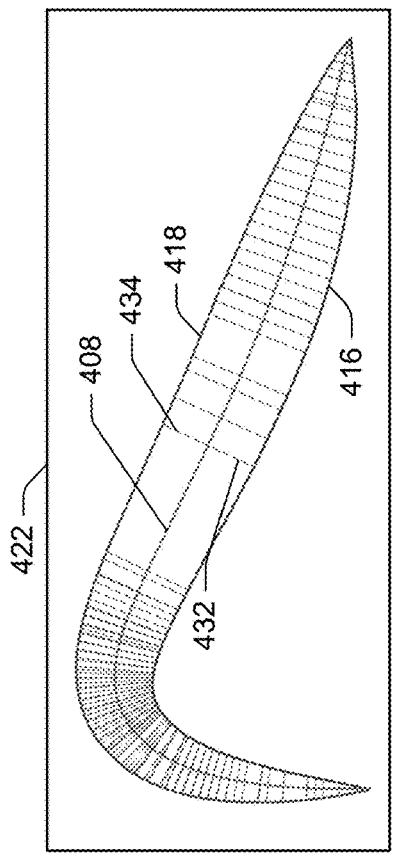
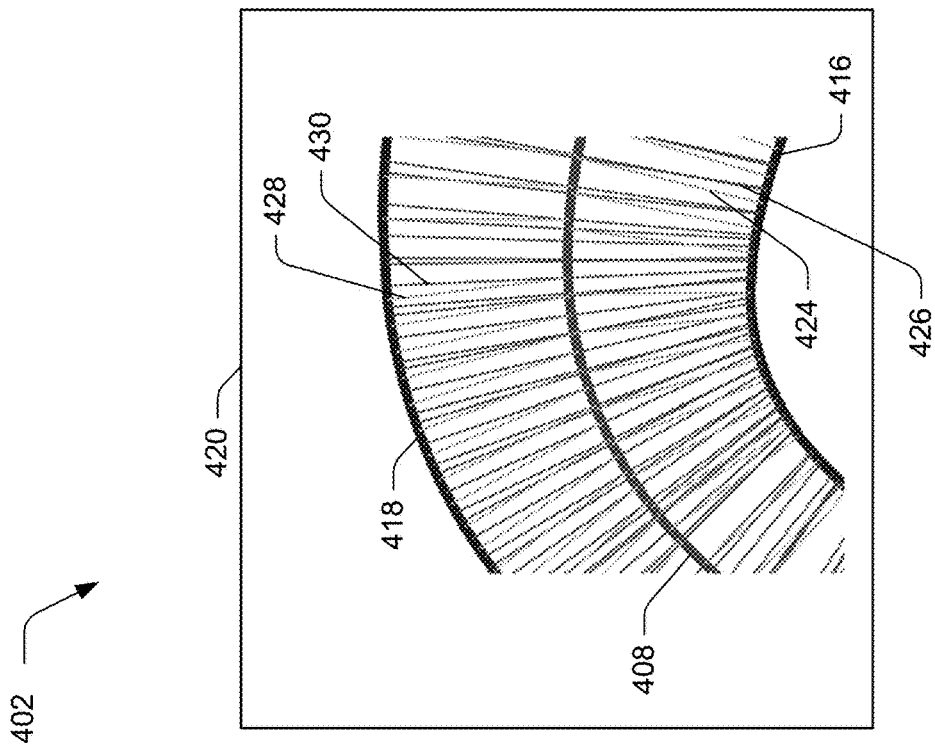
Fig. 4B

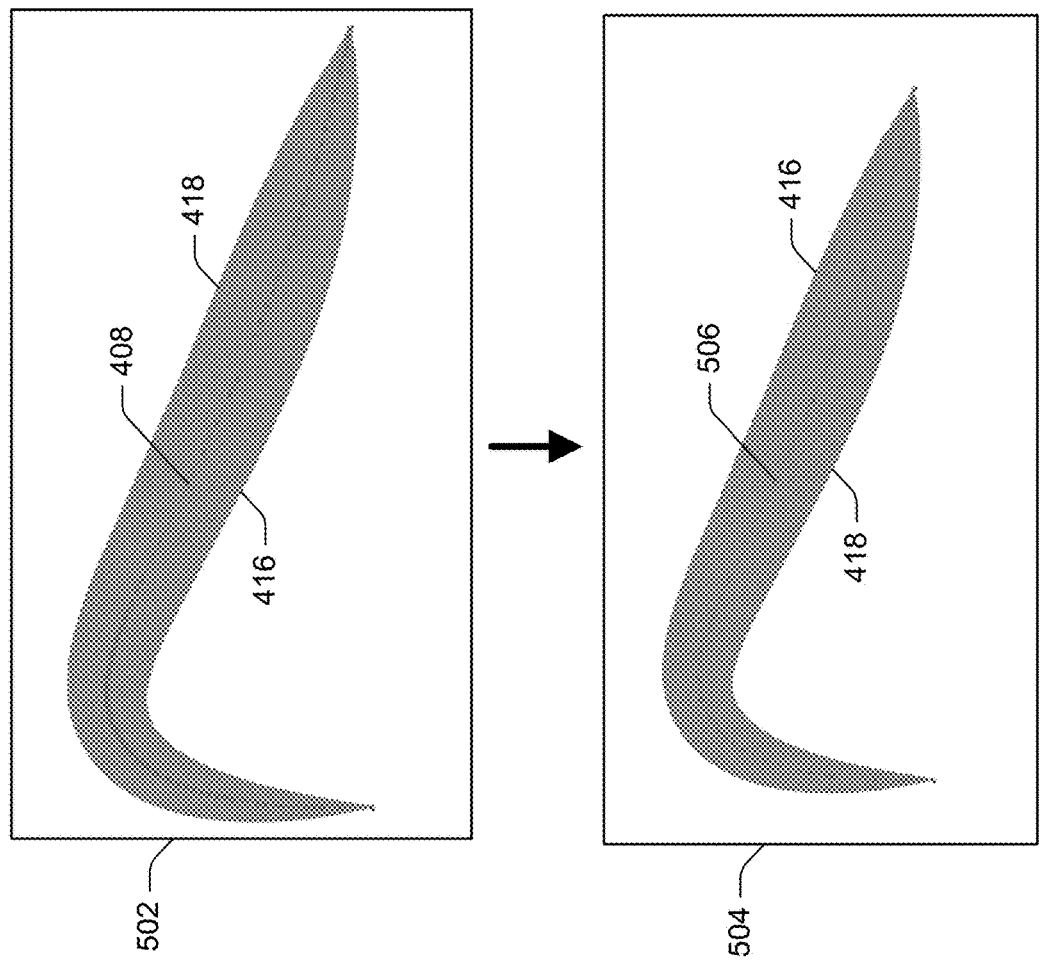

600

602
Receive input data describing a vector object having a filled path

604
Generate a medial axis for the filled path by performing a medial axis transform on a boundary of the filled path

606
Estimate a stroke width based on distances between the medial axis and the boundary of the filled path that are normal to the medial axis

608
Generate, for display in a user interface, a stroked path that is visually similar to the filled path based on the medial axis and the stroke width

*Fig. 6*

SYSTEMS FOR GENERATING STROKED PATHS

BACKGROUND

In systems for creating and editing digital content, vector geometry is represented using paths of straight and curved line segments (e.g., Bezier splines). Visually, a path is rendered as a stroked path, a filled path, or both. For instance, a stroked path includes original path information and is easily convertible to an equivalent filled path (e.g., by computing offset curves at a half stroke width on either side of the stroked path). However, once converted or expanded into a filled path, this original path information is lost and conventional systems are not capable of converting a filled path into an equivalent stroked path. This is a shortcoming of conventional systems because stroked paths are easily editable whereas filled paths are only editable by manipulating anchor points of boundaries.

SUMMARY

Techniques and systems are described for generating stroked paths. In an example, a computing device implements a stroked path system to receive input data describing a vector object having a filled path. The stroked path system generates a medial axis for the filled path by performing a medial axis transform on a boundary of the filled path.

For example, the stroked path system estimates a stroke width based on distances between the medial axis and the boundary of the filled path that are normal to the medial axis. For instance, the stroke width is either uniform or variable. A stroked path is generated for display in a user interface. The stroked path is visually similar to the filled path and the stroke path system generates the stroked path based on the medial axis and the stroke width.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 3A, 3B, 3C, and 3D illustrate examples of receiving input data describing a filled path and generating a medial axis for the filled path.

FIGS. 4A, 4B, and 4C illustrate an example of estimating a stroke width based on a medial axis and a boundary of a filled path.

FIG. 5 illustrates an example representation of generating a stroked path.

FIG. 6 is a flow diagram depicting a procedure in an example implementation in which input data is received describing a vector object having a filled path and a stroked path is generated that is visually similar to the filled path.

DETAILED DESCRIPTION

Overview

Figure 1:
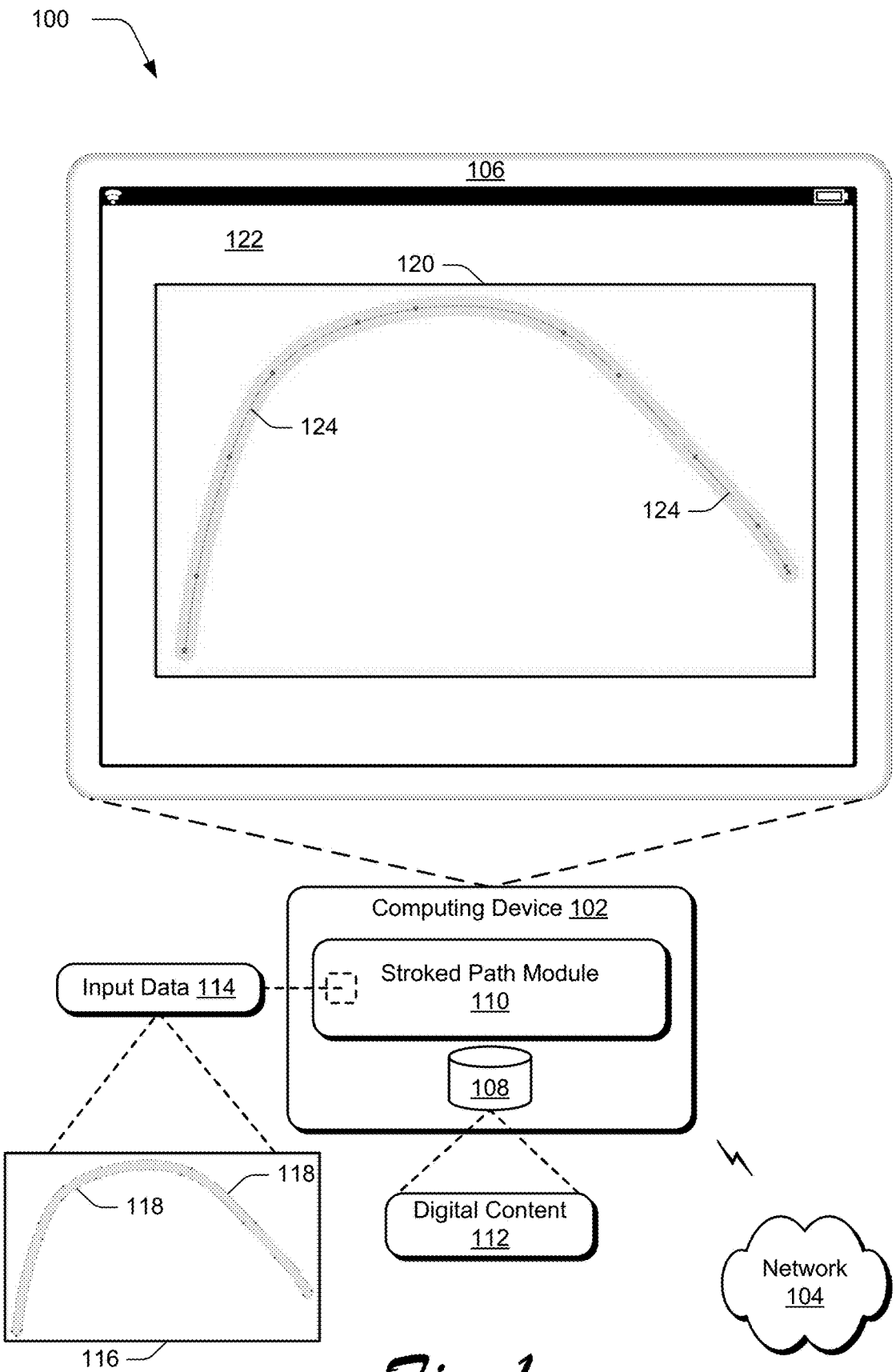
FIG. 1 is an illustration of an environment in an example implementation that is operable to employ digital systems and techniques for generating stroked paths as described herein.

In systems for creating and/or editing digital content, vector geometry is represented using paths. For instance, a visual appearance of a path is rendered as a stroked path, a filled path, or both. Stroked paths include original path information and are easily convertible to an equivalent filled path using the original path information. However, conventional systems are not capable of converting a filled path into an equivalent stroked path. This is because filled paths do not include the original path information and are instead defined by boundaries. Because of this limitation, filled paths are only editable via manipulation of anchor points of the boundaries.

In order to overcome the limitations of conventional systems, techniques and systems are described for generating stroked paths. In one example, a computing device implements a stroked path system to receive input data describing a vector object having a filled path. For instance, the filled path does not include any original path information. The stroked path system generates a medial axis for the filled path by performing a medial axis transform on a boundary of the filled path.

To do so in one example, the stroked path system flattens the boundary into linear segments and identifies points within the boundary that are disposed an equal distance from two of the linear segments. The stroked path system generates the medial axis by connecting the identified points in one example. In other examples, the stroked path system is capable of generating the medial axis using any suitable technique such as identifying the points as center points of a set of disks that maximally fit within the boundary.

For example, the stroked path system segments the boundary into boundary segments and generates connecting segments that connect the boundary segments to the medial axis. Ends of the medial axis are disconnected from the boundary such that the boundary segments are either disposed on a first side of the medial axis or on a second side of the medial axis. In one example, the stroked path system joins the boundary segments disposed on the first side of the medial axis as an inner offset curve and joins the boundary segments disposed on the second side of the medial axis as an outer offset curve.

The stroked path system estimates a stroke width based on distances between the inner and outer offset curves and the medial axis that are normal to the medial axis. In one example, the stroked path system computes a variance of the distances that are normal to the medial axis and compares the variance to a threshold value. If the variance is below the threshold value, then the stroked path system determines the stroke width has a uniform profile. In this example, the stroked path system estimates the stroke width based on a mode of the distances that are normal to the medial axis.

If the variance is above the threshold value, then the stroked path system determines the stroke width has a variable profile. In this example, the stroked path system determines distances between sets of points and the medial axis that are normal to the medial axis. Each set of points includes a point on the inner offset curve and a point on the outer offset curve. The stroked path system also determines a length fraction for each set of points. The length fraction represents a location of the set of points relative to the medial axis with respect to an entirety of the medial axis. For example, the stroked path system estimates the stroke width based on the distances that are normal to the medial axis and the length fractions.

In some examples, the stroked path system also identifies stroke attributes such as a type of cap, a type of join, a type of dash, etc. To do so, the stroked path system generates candidate stroked paths based on the medial axis and the stroke width. These candidate stroked paths include different stroke attributes and the stroked path system identifies the stroke attributes by comparing the candidate stroked paths to the filled path. For instance, the stroked path system rasterizes the filled path and rasterizes the candidate stroked paths and compares the rasterized candidate stroke paths to the rasterized filled path to identify the stroke attributes.

The stroked path system then generates a stroked path for display in a user interface based on the stroke width, the medial axis, and the stroke attributes. The stroked path is visually similar to the filled path and the stroked path also includes original path information (e.g., reproduced original path information). This is not possible using conventional systems that are incapable of converting a filled path to an equivalent stroked path. For instance, the stroked path is easily editable which is a technological improvement to conventional content creation technology. Moreover, the described systems are capable of generating an equivalent stroked path for any vector object such as a glyph of a font which is also not possible using conventional systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a stroked path module 110. The storage device 108 is illustrated to include digital content 112. Examples of digital content 112 include raster images such as digital photographs, vector images such as digital graphic artwork, digital videos, etc.

The stroked path module 110 is illustrated as having, receiving, and/or transmitting input data 114. As shown, the input data 114 describes a filled path 116 having an arc shape which is defined by a boundary 118. For example, the filled path 116 has been converted from a stroked path and information included in the stroked path (e.g., geometric information) is no longer available in the filled path 116. Because this information is no longer available, editing the filled path 116, for example, to flatten the arc shape is only possible by modifying the boundary 118. Similarly, editing the filled path 116 to increase or decrease a thickness of the filled path 116 is only possible by modifying the boundary 118.

In order to reproduce the information that is no longer available in the filled path 116, the stroked path module 110 processes the input data 114 to generate a stroked path 120 which is displayed in a user interface 122 of the display device 106. To do so in one example, the stroked path module 110 generates a medial axis for the filled path 116 by performing a medial axis transform on the boundary 118. In this example, the stroked path module 110 generates the medial axis by flattening the boundary 118 into linear samples and identifying points within the boundary 118 that have a same minimum distance to at least two points (e.g., two linear samples) of the boundary 118. For example, the minimum distances are normal to the boundary 118 and the stroked path module 110 connects the identified points to generate the medial axis.

In another example, the stroked path module 110 generates the medial axis for the filled path 116 by identifying center points of a set of disks that maximally fit into the boundary 118. The stroked path module 110 then connects the identified center points to generate the medial axis. It is to be appreciated that generating the medial axis for the filled path 116 is possible using a variety of different techniques and the stroked path module 110 is capable of generating the medial axis for the filled path 116 using any suitable technique.

Once the medial axis has been generated, the stroked path module 110 segments the boundary 118 into boundary segments and generates connecting segments that connect the boundary segments to the medial axis. The stroked path module 110 forms a transformation graph having nodes such that each of the nodes represents a medial axis segment of the medial axis, a boundary segment of the boundary 118, or a connecting segment. For instance, the stroked path module 110 uses connectivity (e.g., edge incidence) of the transformation graph to sort the medial axis segments and the boundary segments, and the stroked path module 110 also disconnects ends of the medial axis from the boundary 118.

The stroked path module 110 identifies aligned boundary segments based on relative angles between the boundary segments and the medial axis segments. Next, stroked path module 110 partitions the boundary segments based on directions of the boundary segments and the medial axis segments (e.g., either aligned or reverse aligned). The partitioned boundary segments are organized based on their orientation relative to the medial axis. For example, by disconnecting the ends of the medial axis from the boundary 118, the partitioned boundary segments are oriented on a first side of the medial axis or on a second side of the medial axis. The stroked path module 110 joins the partitioned boundary segments oriented on the first side of the medial axis as an inner offset curve. Similarly, the stroked path module 110 joins the partitioned boundary segments oriented on the second side of the medial axis as an outer offset curve.

In an example, the stroked path module 110 estimates a stroke width based on distances between the medial axis and the boundary 118 that are normal to medial axis. To do so, the stroked path module 110 computes distances from the medial axis to the inner offset curve and also computes distances from the medial axis to the outer offset curve. For instance, the stroked path module 110 computes a variance for the distances between the medial axis and the boundary 118 and compares the variance to a threshold value. If the variance is below the threshold value, then the stroked path module 110 determines that the boundary 118 has a uniform width profile. Alternatively, if the variance is above the threshold value, then the stroked path module 110 determines that the boundary 118 has a variable width profile.

In the illustrated example, the stroked path module 110 determines that the boundary 118 has a uniform width profile. Because the boundary 118 has the uniform width profile, the stroked path module 110 estimates the stroke width based on a mode of the distances that are normal to the medial axis. For example, the stroked path module 110 is also capable of estimating the stroke width based on a mean of the distances.

In an example in which the stroked path module 110 determines that the boundary 118 has a variable width profile, the stroked path module 110 estimates that stroke width by determining distances between sets of points of the boundary 118 and the medial axis on each side of the boundary 118 (e.g., distances from the medial axis to the inner offset curve and from the medial axis to the outer offset curve) as well as length fraction for each set of the points. In this example, the length fraction represents a location of a particular set of the points relative to the medial axis with respect to an entirety of the medial axis. The stroked path module 110 then estimates the stroke width based on the determined distances between the sets of the points and the corresponding length fractions.

Since the stroked path module 110 disconnected the ends of the medial axis from the boundary 118 in order to estimate the stroke width, the stroked path module 110 adds one segment to each end of the medial axis to compensate for the disconnection. To do so in one example, the stroked path module 110 projects a first point from each end of the medial axis onto a nearest portion of the inner offset curve and projects a second point from each end of the medial axis onto a nearest portion of the outer offset curve. The stroked path module 110 then connects each end of the medial axis to a midpoint of the first and second projected points using a straight line (e.g., a linear segment).

The stroked path module 110 also identifies stroke attributes such as a type of cap, a type of join, a type of dash, and so forth. The stroked path module 110 generates candidate stroked paths based on the medial axis and the stroke width having the stroke attributes and identifies the stroke attributes by comparing the candidate stroked paths with the filled path 116. For example, the stroked path module 110 rasterizes the filled path 116 and rasterizes the candidate stroked paths and computes losses between the rasterized filled path 116 and the rasterized candidate stroked paths. The stroked path module 110 identifies the stroke attributes based on a candidate stroked path having a minimum computed loss relative to the filled path 116.

The stroked path module 110 generates the stroked path 120 based on the medial axis, the stroke width, and the stroke attributes. As shown, the stroked path 120 includes an editable path 124 and the stroked path 120 is visually similar to the filled path 116. In one example, the stroked path module 110 generates the stroked path 120 having an initial editable path (e.g., the medial axis) which is a polyline having a first number of anchor points. In this example, the stroked path module 110 optimizes the initial editable path to reduce the first number of anchor points and generates the editable path 124 based on the optimization as having a second number of anchor points which is less than the first number of anchor points.

Unlike the filled path 116, the stroked path 120 is editable, e.g., via manipulation of the editable path 124 to flatten the arc shape, increase or decrease a thickness of the stroked path 120, and so forth. Additionally, the stroked path module 110 is capable of retaining the estimated stroke width for application to other digital objects. Furthermore, it is to be appreciated that the stroked path module 110 is capable of generating a stroked path for any filled path of a vector object including glyphs of fonts, graphic artwork, etc.

Figure 2:
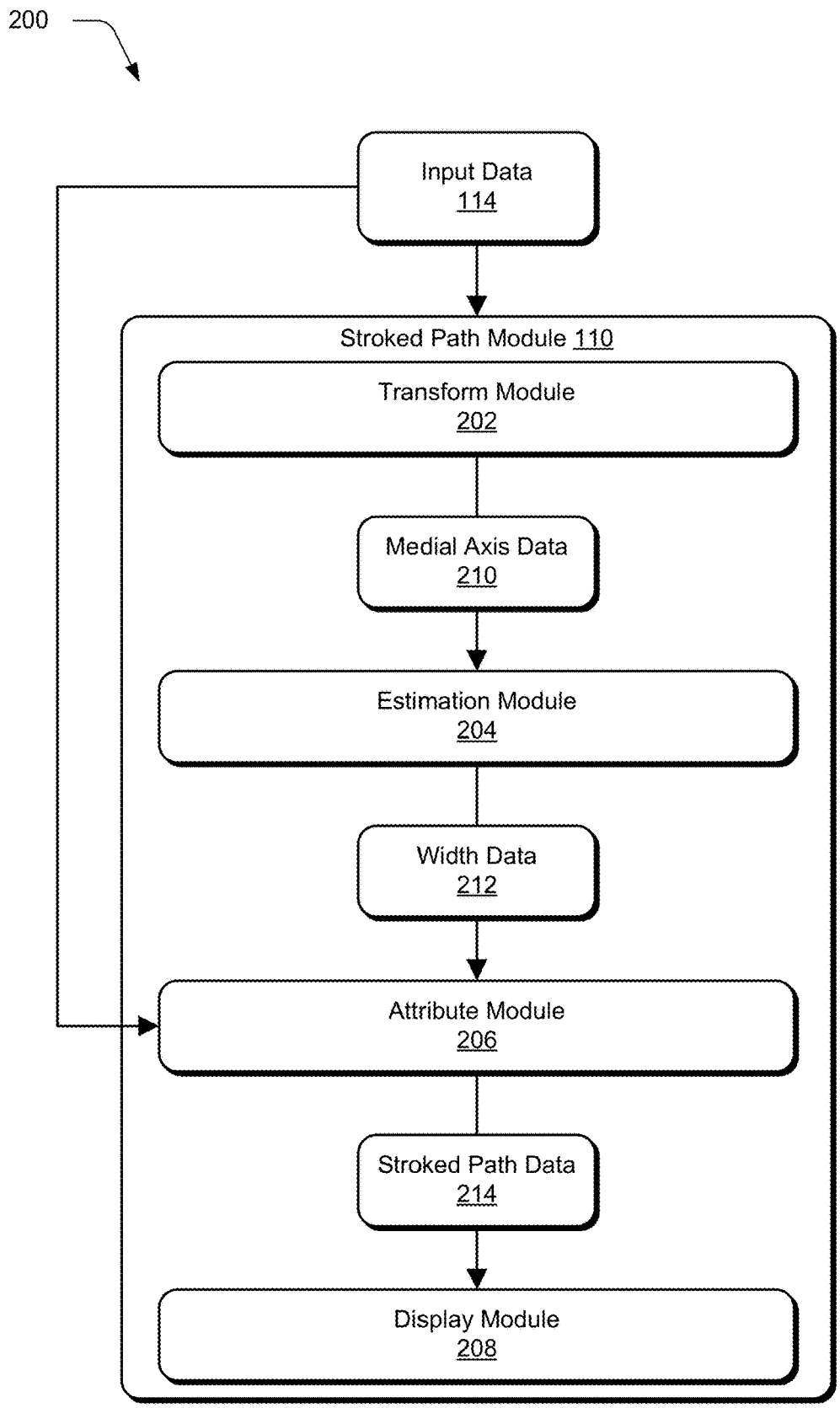
FIG. 2 depicts a system in an example implementation showing operation of a stroked path module for generating stroked paths.

FIG. 2 depicts a system 200 in an example implementation showing operation of a stroked path module 110. The stroked path module 110 is illustrated to include a transform module 202, an estimation module 204, an attribute module 206, and a display module 208. The stroked path module 110 receives input data 114 describing a vector object having a filled path. For example, the transform module 202 processes the input data 114 to generate medial axis data 210.

Figure 3B:
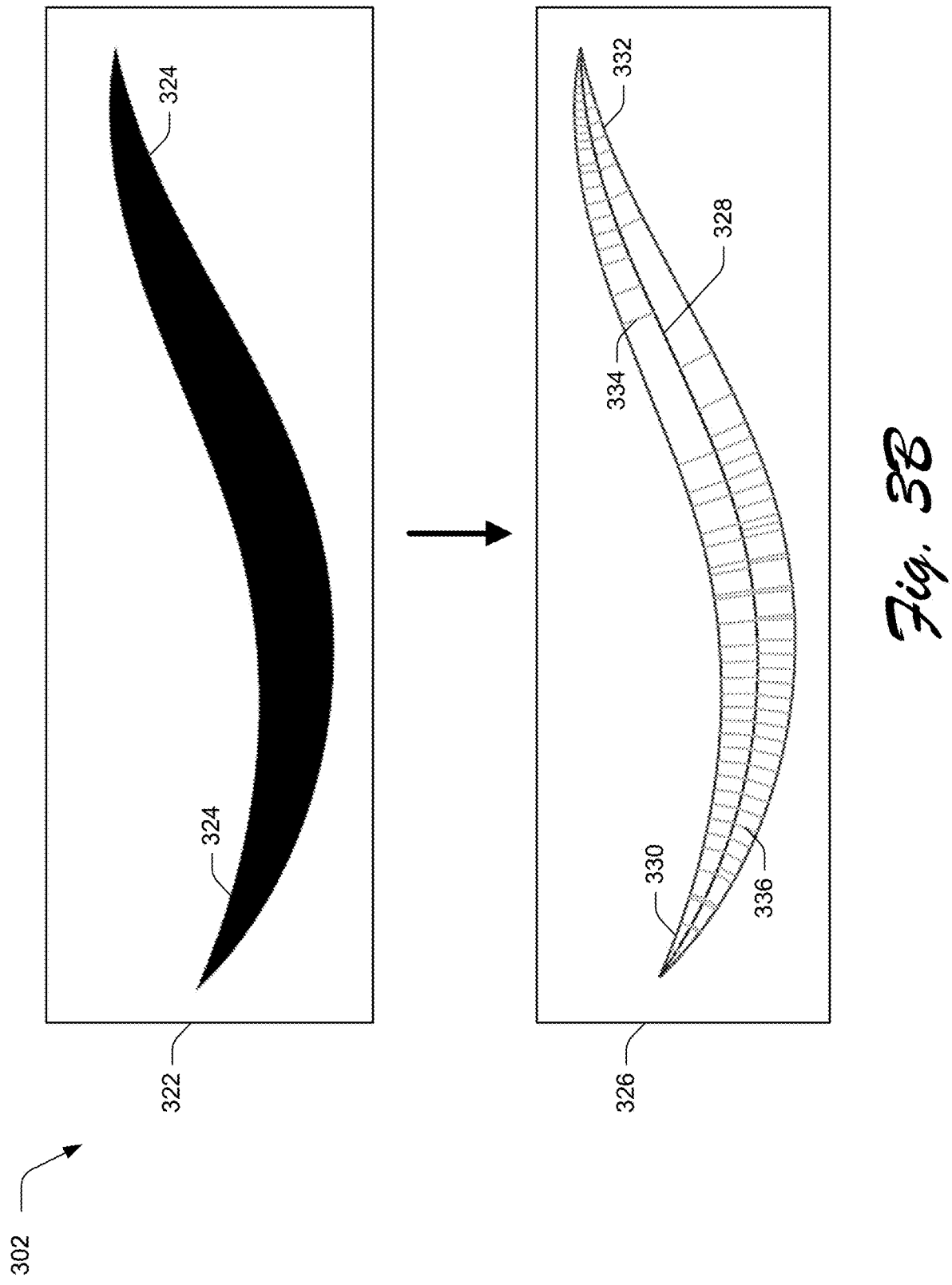

FIGS. 3A, 3B, 3C, and 3D illustrate examples of receiving input data describing a filled path and generating a medial axis for the filled path. FIG. 3A illustrates a representation 300 of generating medial axis data 210 based on input data 114 describing a filled path with a uniform stroke width. FIG. 3B illustrates a representation 302 of generating medial axis data 210 based on input data 114 describing a filled path with a variable stroke width. FIG. 3C illustrates a representation 304 of disconnecting ends of a medial axis from a boundary. FIG. 3D illustrates a representation 306 of generating medial axis data 210 based on input data 114 describing multiple filled paths.

With respect to FIGS. 2 and 3A, the input data 114 describes a filled path 308 which is an S-shape defined by a boundary 310 in this example. In one example, the filled path 308 is a glyph rendered using a font. In another example, the filled path 308 has been converted from a stroked path and path information included in the stroked path is no longer included in the filled path 308. For instance, it is only possible to edit the filled path 308 by manipulating the boundary 310 or by manually reproducing the path information that is no longer included in the filled path 308.

In order to automatically reproduce the path information that is no longer included in the filled path 308, the transform module 202 processes the input data 114 to perform a medial axis transform on the boundary 310. As shown in the representation 300, the transform module 202 generates the medial axis data 210 as describing a result 312 of performing the medial axis transform on the boundary 310. By performing the medial axis transform on the boundary 310, the transform module 202 generates a medial axis 314 for the filled path 308. To do so in one example, the transform module 202 flattens the boundary 310 into linear samples and identifies points within the boundary 310 that are disposed an equal distance from at least two of the linear samples. For instance, the equal distance is normal to the boundary 310. In this example, the transform module 202 connects the identified points to generate the medial axis 314.

In another example, the transform module 202 identifies center points of a set of disks that maximally fit into the boundary 310. The transform module 202 then generates the medial axis 314 by connecting the identified center points. In other examples, the transform module 202 generates the medial axis 314 by performing the medial axis transform on the boundary 310 as described by Lee, D. T., *Medial Axis Transformation of a Planar Shape*, IEEE Transactions on Pattern Analysis and Machine Intelligence, Vol. PAM1-4, No. 4, p. 363-9 (1982). It is to be appreciated that generating the medial axis 314 for the filled path 308 is performable using multiple techniques and the transform module 202 is capable of generating the medial axis 314 for the filled path 308 using any particular technique of the multiple techniques.

For instance, the transform module 202 segments the medial axis 314 into medial axis segments and segments the boundary 310 into boundary segments which is described in greater detail with respect to FIG. 3C. The transform module 202 partitions the boundary segments based on directions of the boundary segments and directions of the medial axis segments. For example, a particular partitioned boundary segment is either aligned or reverse aligned with a corresponding particular medial axis segment. As shown in the result 312, ends of the medial axis 314 are disconnected from the boundary 310 such that the partitioned boundary segments are either disposed on a first side of the medial axis 314 or disposed on a second side of the medial axis 314. Thus, if the particular partitioned boundary segment is aligned with the corresponding particular medial axis segment, then the particular partitioned boundary segment is disposed on the first side of the medial axis 314. Similarly, if the particular partitioned boundary segment is reverse aligned with the corresponding particular medial axis segment, then the particular partitioned boundary segment is disposed on the second side of the medial axis 314.

In the illustrated example, a first boundary segment is disposed on the first side of the medial axis 314 and the transform module 202 generates an inner offset curve 316 based on the first boundary segment. In an example in which multiple boundary segments are disposed on the first side of the medial axis 314, the transform module 202 generates the inner offset curve 316 by joining the multiple boundary segments. A second boundary segment is disposed on the second side of the medial axis 314 and the transform module 202 generates an outer offset curve 318 based on the second boundary segment. In a similar example in which several boundary segments are disposed on the second side of the medial axis 314, the transform module 202 generates the outer offset curve 318 by joining the several boundary segments.

The result 312 includes connecting segments 320 that connect the medial axis 314 to the inner offset curve 316 and that connect the medial axis 314 to the outer offset curve 318. For example, the connecting segments 320 represent distances that are normal to the medial axis 314 as described in detail with respect to FIG. 4B. As shown, the connecting segments 320 each have a same length because the filled path 308 has a uniform stroke width. As further shown, the connecting segments 320 are not equally distributed (e.g., evenly spaced) between the medial axis 314 and the inner and outer offset curves 316, 318. This is because in the transform module 202 generates a minimum number of connecting segments 320 which are usable to reconstruct the filled path 308 in one example. Accordingly, in this example, the transform module 202 generates the medial axis data 210 as describing the result 312.

In another example and with respect to FIGS. 2 and 3B, the input data 114 describes a filled path 322 which is an asymmetric shape defined by a boundary 324. Like the filled path 308, the filled path 322 is only editable by manipulation of the boundary 324. For example, the filled path 322 has been converted from a stroked path and path information included in the stroked path is no longer included in the filled path 322. In order to reproduce the path information that is no longer included in the filled path 322, the transform module 202 processes the input data 114 to perform a medial axis transform on the boundary 324. In this example, the transform module 202 generates the medial axis data 210 as describing a result 326 of performing the medial axis transform on the boundary 324.

As shown in the representation 302, the transform module 202 generates a medial axis 328 for the filled path 322 by performing the medial axis transform on the boundary 324. In one example, the transform module 202 generates the medial axis 328 by flattening the boundary 324 into linear segments and identifying points within the boundary 324 that are disposed an equal distance (e.g., normal to the boundary 324) from two of the linear segments. In this example, the transform module 202 connects the identified points to generate the medial axis 328. As in the previous example, the transform module 202 is capable of generating the medial axis 328 for the filled path 322 using any suitable technique.

Also as in the previous example, the transform module 202 segments the medial axis 328 into medial axis segments and segments the boundary 324 into boundary segments. The transform module 202 partitions the boundary segments based on directions of the boundary segments and directions of the medial axis segments. As shown, the medial axis 328 is a single segment and a first boundary segment is disposed on a first side of the medial axis 328 and a second boundary segment is disposed on a second side of the medial axis 328. For example, the transform module 202 generates an inner offset curve 330 based on the first boundary segment and the transform module 202 generates an outer offset curve 332 based on the second boundary segment.

For instance, the result 326 includes connecting segments 334, 336. Connecting segment 334 represents a normal distance from the medial axis 328 to the inner offset curve 330 and connecting segment 336 represents a normal distance from the medial axis 328 to the outer offset curve 332. The connecting segments 334, 336 do not have a same length because the filled path 322 has variable stroke width. Accordingly, the transform module 202 generates the medial axis data 210 as describing the result 326.

FIG. 3C illustrates intermediate results 338, 340 of processing the input data 114 that describes the filled path 308 before the transform module 202 generates the result 312. As shown, in intermediate result 338, the transform module 202 has generated the medial axis 314 and disconnected the ends of the medial axis 314 from the boundary 310. For example, the transform module 202 forms a transformation graph that has nodes such that each node represents a medial axis segment of the medial axis 314, a boundary segment of the boundary 310, or a connecting segment 320.

The transform module 202 leverages a connectivity or an edge incidence of the transformation graph to partition the boundary segments as either being disposed on the first side of the medial axis 314 or being disposed on the second side of the medial axis 314. To do so in one example, the transform module 202 identifies aligned boundary segments by comparing relative angles between the medial axis segments and the boundary segments. For instance, to filter aligned boundary segments, the transform module 202 uses an empirical value of 30 degrees as a comparison metric. However, in some examples, the transform module 202 filters aligned boundary segments using a comparison metric that is a value of less than 30 degrees or greater than 30 degrees.

As described previously and shown in intermediate result 340, the transform module 202 joins boundary segments partitioned on the first side of the medial axis 314 as the inner offset curve 316 and joins boundary segments partitioned on the second side of the medial axis 314 as the outer offset curve 318. The transform module 202 generates the connecting segments 320 that are normal to the medial axis 314 and connects the medial axis 314 and the inner offset curve 316. For example, the transform module 202 also generates the connecting segments 320 that are normal to the medial axis 314 and connects the medial axis 314 and the outer offset curve 318. In this example, the transform module 202 generates the medial axis data 210 as describing the result 312.

The representation 306 depicted in FIG. 3D includes an example of a filled path 342 defined by a boundary 344, and the transform module 202 classifies the filled path 342 as having multiple stroked paths. For instance, the transform module 202 classifies the filled path 308 as having a single stroked path because the medial axis 314 includes a single medial axis segment (e.g., does not include branches). Similarly, the transform module 202 classifies the filled path 322 as having a single stroked path because the medial axis 328 includes a single medial axis segment. In order to classify the filled path 342, the transform module 202 performs a medial axis transform on the boundary 344.

As shown in FIG. 3D, the representation 306 includes a result 346 of performing the medial axis transform on the boundary 344. The transform module 202 generates a medial axis for the filled path 342 that includes a first medial axis segment 348, a second medial axis segment 350, and a third medial axis segment 352. The transform module 202 classifies the filled path 342 as having three stroked paths based on the three medial axis segments 348, 350, 352. For example, transform module 202 constructs a transform graph for the filled path 342 having nodes such that each of the nodes represents a boundary segment, one of the medial axis segments 348-352, or a connecting segment 354-364.

For example, the transform module 202 generates the medial axis data 210 based on input data 114 describing the filled path 342 in iterations, e.g., one iteration for each of the medial axis segments 348-352. To do so, the transform module 202 identifies a straightest one of the medial axis segments 348-352 which has a minimum deviation per unit length. For instance, the transform module 202 identifies the first medial axis segment 348 as having the minimum deviation per unit length, and the transform module 202 generates the medial axis data 210 for the first medial axis segment 348.

The transform module 202 then subtracts the first medial axis segment 348 from the transformation graph and repeats this process until the transformation graph becomes empty. In one example, the transform module 202 generates the medial axis data 210 for the second medial axis segment 350 and then subtracts the second medial axis segment 350 from the transformation graph. Finally, the transform module 202 generates the medial axis data 210 for the third medial axis segment 352 and subtracts the third medial axis segment from the transformation graph. In this manner, the transform module 202 generates the medial axis data 210 as describing the result 346.

Figure 4C:
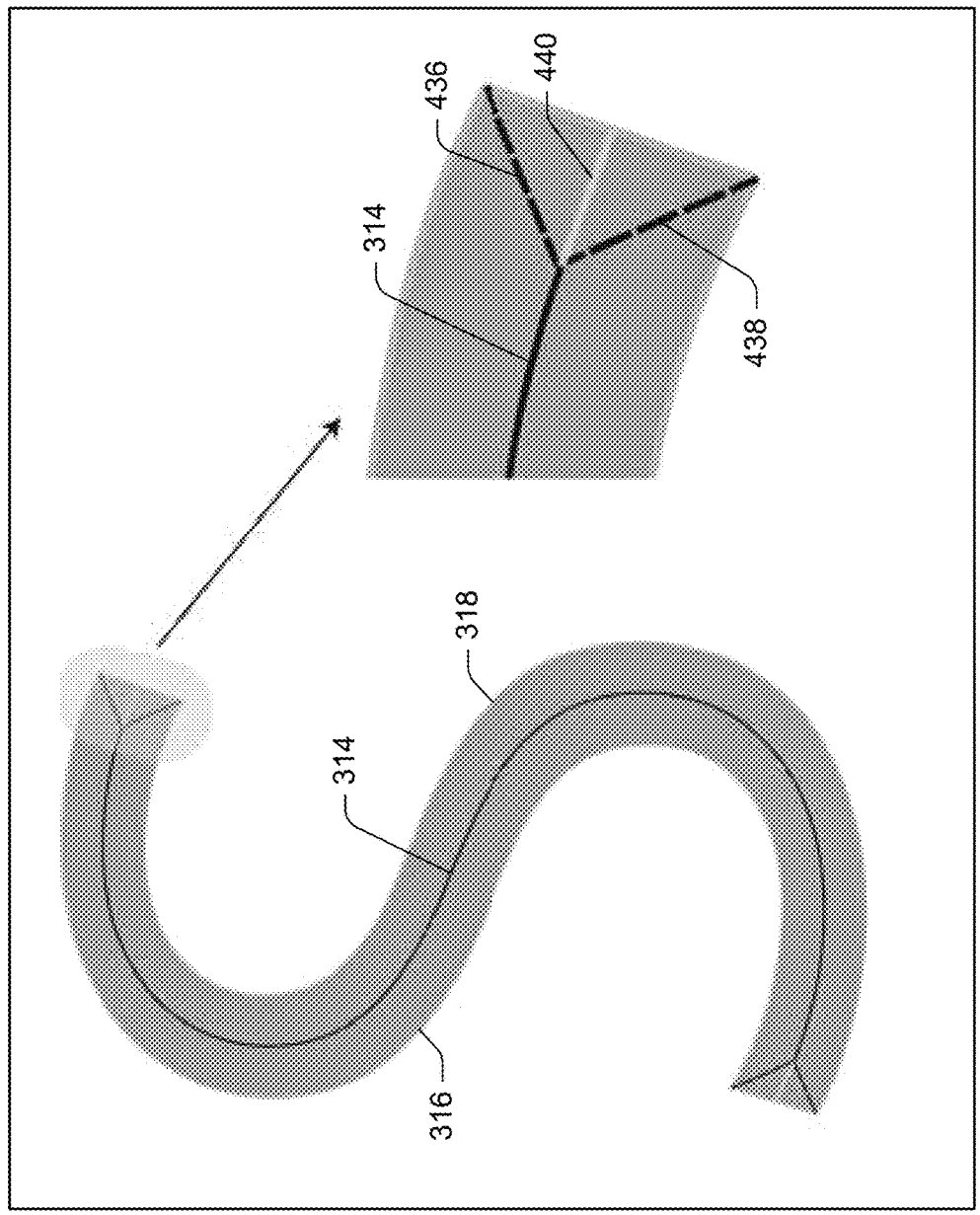

As shown in FIG. 2, the estimation module 204 receives the medial axis data 210 and processes the medial axis data 210 to generate width data 212. FIGS. 4A, 4B, and 4C illustrate an example of estimating a stroke width based on a medial axis and a boundary of a filled path. FIG. 4A illustrates a representation 400 of a result of performing a medial axis transform described by the medial axis data 210. FIG. 4B illustrates a representation 402 of distances between a medial axis and a boundary that are normal to the medial axis and distances between the medial axis and the boundary that are normal to the boundary. FIG. 4C illustrates a representation 404 of computing stroke end points.

As illustrated in the representation 404, the medial axis data 210 describes a result 406 of performing a medial axis transform on a boundary of a filled path. The result 406 includes a medial axis 408 and connecting segments 410, 412. The medial axis data 210 also describes offset curves 414 including an inner offset curve 416 and an outer offset curve 418. With reference to FIG. 4B, the representation 402 includes an illustration 420 which depicts differences between distances from the medial axis 408 to the offset curves 414 that are normal to the medial axis 408 and distances from the offset curves 414 to the medial axis 408 that are normal to the offset curves 414. The representation 402 also includes an illustration 422 of estimating a stroke width.

As shown in the illustration, distance 424 between the inner offset curve 416 and the medial axis 408 is normal to the inner offset curve 416 while distance 426 between the inner offset curve 416 and the medial axis 408 is normal to the medial axis 408. For example, the estimation module 204 uses the distance 426 to estimate the stroke width. Similarly, distance 428 between the outer offset curve 418 and the medial axis 408 is normal to the outer offset curve 418 and distance 430 between the outer offset curve 418 and the medial axis 408 is normal to the medial axis 408. In an example, the estimation module 204 leverages the distance 430 to estimate the stroke width.

To do so in one example, the estimation module 204 computes a variance of the distances 432, 434 that are normal to the medial axis 408 and compares the variance to a threshold value to determine whether the stroke width has a uniform width profile or a variable width profile. If the variance is less than the threshold value, then the estimation module 204 determines that the stroke width has the uniform width profile and the estimation module 204 estimates the stroke width based on a mode of the distances 432, 434 in a first example. In a second example, the estimation module 204 is capable of estimating the stroke width based on an average of the distances 432, 434. For instance, the estimation module 204 estimates the stroke width according to the first example to account for floating point inaccuracies and to estimate a more naturally appearing stroke width (e.g., 5 point instead of 4.97 point).

For example, if the variance is greater than the threshold value, then the estimation module 204 determines that the stroke width has the variable width profile. In this example, the distances 432, 434 represent a width pair and the estimation module 204 also determines a length fraction for each width pair. The length fraction reflects a location of the width pair relative to the entirety of the medial axis 408. For instance, the estimation module 204 determines a length fraction for the distances 432, 434 of about 50 percent because the distances 432, 434 are disposed about halfway between the ends points of the medial axis 408. The estimation module 204 then estimates the stroke width based on all of the width pairs.

Regardless of whether the estimation module 204 estimates the stroke width as having the uniform width profile or the variable width profile, the estimation module 204 generates the width data 212 as describing the estimated stroke width. The estimation module 204 also generates the width data 212 as describing computed stroke end points which is illustrated in FIG. 4C. Because the transform module 202 disconnected the ends of the medial axis 314 from the boundary 310, the estimation module 204 computes stroke end points to accommodate for the disconnection. To do so, the estimation module 204 projects one point from each end of the medial axis 314 to a nearest portion of the inner offset curve 316 and projects one point from each end of the medial axis 314 to a nearest portion of the outer offset curve 318.

In the illustrated example, a first projection 436 projects a first point to the nearest portion of the inner offset curve 316 and a second projection 438 projects a second point to the nearest portion of the outer offset curve 318. For example, the estimation module 204 computes a midpoint of the projections 436, 438 and connects the end of the medial axis 314 to the midpoint using a linear segment 440 (e.g., a straight line). The estimation module 204 then generates the width data 212 as describing the computed stroke end points.

As shown in FIG. 2, the attribute module 206 receives the width data 212 and the input data 114, and the attribute module 206 processes the width data 212 and/or the input data 114 to generate stroked path data 214. For instance, the attribute module 206 processes the width data 212 to identify stroke attributes by generating candidate stroked paths having different stroke attributes and comparing the candidate stroked paths to the filled path described by the input data 114. For example, a stroke attribute is a type of cap, a type of join, or a type of dash. Examples of types of caps include butt caps, round caps, projecting caps, etc. Examples of types of joins include miter joins, round joins, bevel joins, and so forth.

Since a search space is relatively small (e.g., only a few stroke attributes are available), the attribute module 206 generates a candidate stroked path for each possible combination of the stroke attributes. To compare the candidate stroked paths to the filled path, the attribute module 206 rasterizes the candidate stroked paths and downscales the rasterized candidate stroked paths to a unit bounding box. The attribute module 206 also rasterizes the filled path described by the input data 114 and downscales the rasterized filled path to the unit bounding box.

For instance, the attribute module 206 computes a union of the downscaled filled path and each downscaled candidate stroked path applying suitable padding to account for the stroked width and then computes a loss between the downscaled filled path and each downscaled candidate stroke path. For example, the attribute module 206 computes the loss as an $L_2$ loss. The attribute module 206 then determines the candidate stroke path with the minimum loss and identifies the attributes of this candidate stroke path as the stroke attributes. The attribute module 206 generates the stroked path data 214 as describing the medial axis 408, the stroke width, and the stroke attributes.

FIG. 5 illustrates an example representation 500 of generating a stroked path. With respect to FIGS. 2 and 5, the display module 208 receives the stroked path data 214 which is usable to generate an initial stroked path 502. As shown, the initial stroked path 502 has a first number of anchor points and the display module 208 processes the stroked path data 214 to optimize the initial stroked path 502 and reduce the first number of anchor points. The display module 208 generates a stroked path 504 having an editable path 506 and a second number of anchor points which is less than the first number of anchor points. To do so, the display module 208 processes the stroked path data 214 to compute a simplified curve by iteratively refining parametric values using, e.g., a Newton-Raphson method with line-search. In this manner, the display module 208 approaches simplification of the initial stroked path 502 as an optimization problem, and the display module 208 generates the stroked path 504 based on this optimization. As shown, the stroked path 504 is visually similar to the filled path described by the input data 114. However, unlike the filled path, the stroked path 504 is easily editable by manipulation of the editable path 506. For example, the display module 208 is also capable of accessing the width data 212 and leveraging the width data 212 to apply a variable width profile of the stroked path 504 to another vector object such as a glyph of a font.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-5. FIG. 6 is a flow diagram depicting a procedure 600 in an example implementation in which input data is received describing a vector object having a filled path and a stroked path is generated that is visually similar to the filled path.

Input data describing a vector object having a filled path is received (block 602). For example, the computing device 102 implements the stroked path module 110 to receive the input data. A medial axis is generated for the filled path by performing a medial axis transform on a boundary of the filled path (block 604). The stroked path module 110 generates the medial axis by performing the medial axis transform on the boundary of the filled path in an example.

A stroke width is estimated based on distances between the medial axis and the boundary of the filled path that are normal to the medial axis (block 606). In one example, the computing device 102 implements the stroked path module 110 to estimate the stroke width. A stroked path is generated for display in a user interface that is visually similar to the filled path based on the medial axis and the stroke width (block 608). For example, the stroked path module 110 generates the stroked path for display in the user interface.

Figure 7A:
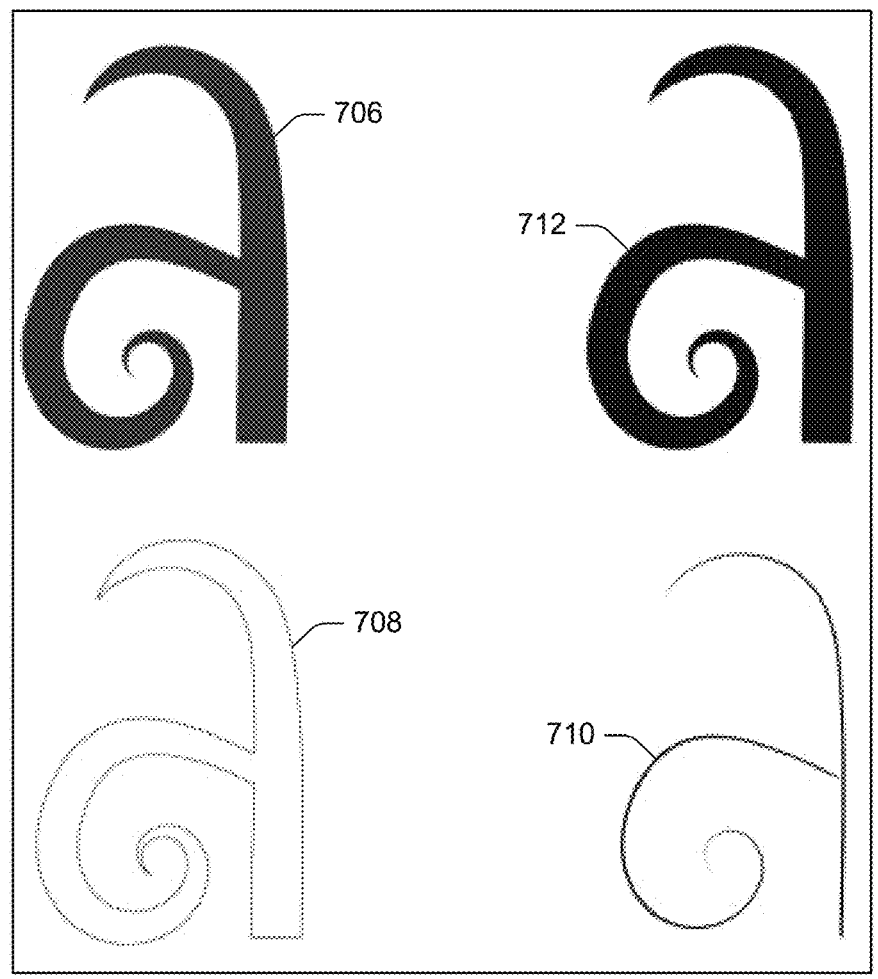
FIGS. 7A, 7B, and 7C illustrate examples of stroked paths generated from filled paths.
Figure 7B:
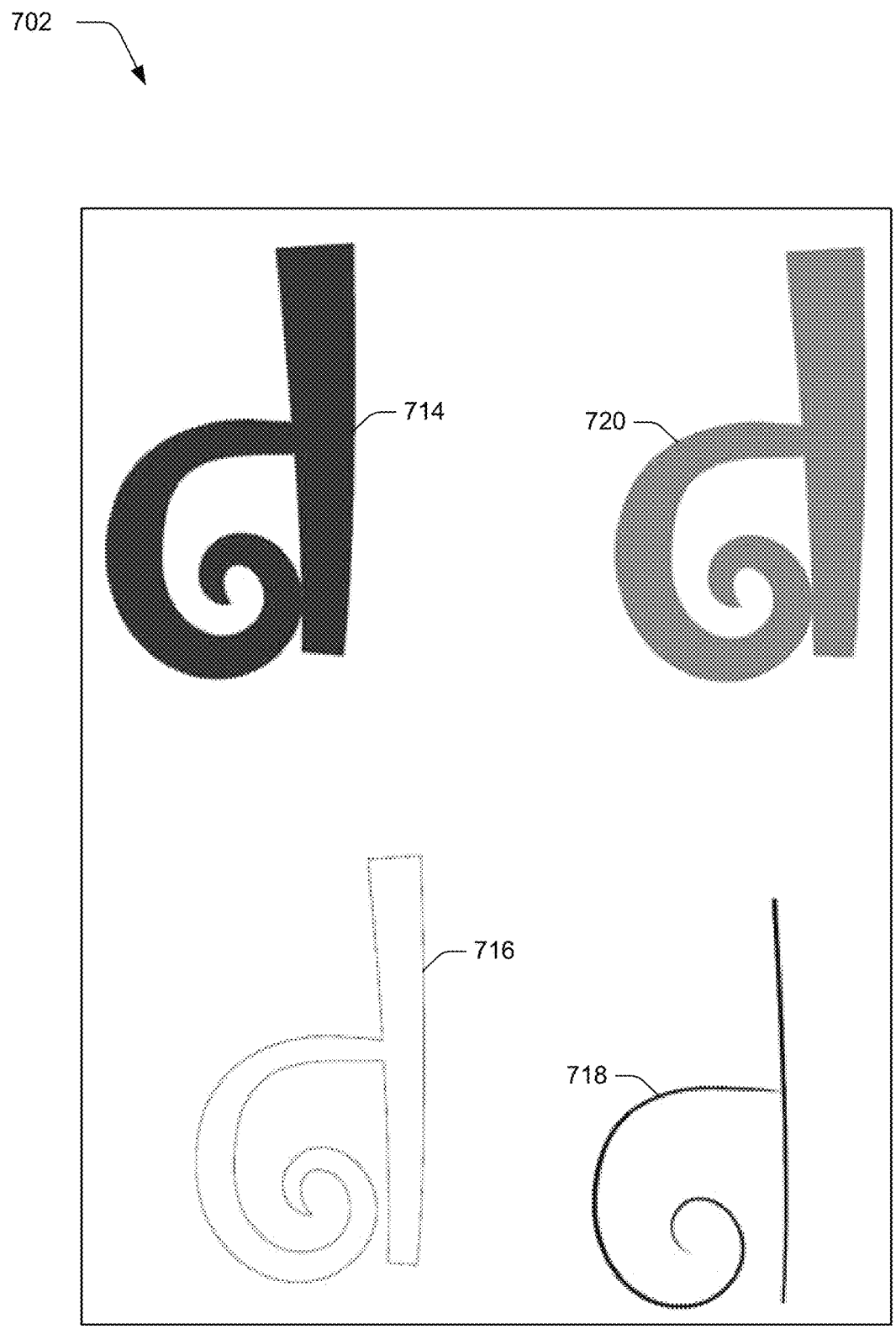
Figure 7C:
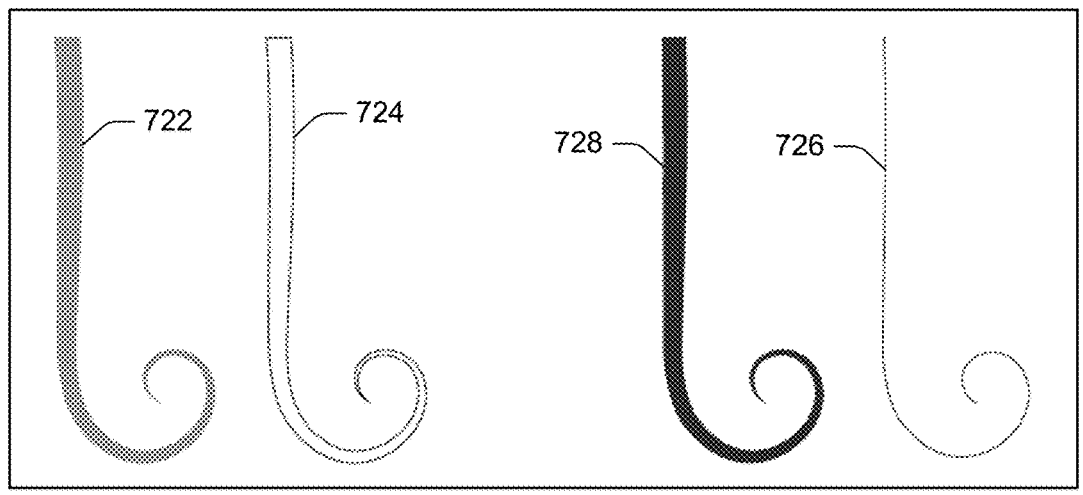

FIGS. 7A, 7B, and 7C illustrate examples of stroked paths generated from filled paths. FIG. 7A illustrates a representation 700 of a filled path which is a stylized lowercase "a" glyph. FIG. 7B illustrates a representation 702 of a filled path which is a stylized lowercase "d" glyph. FIG. 7C illustrates a representation 704 of a filled path which is an asymmetric shape.

As shown in in the representation 700 depicted in FIG. 7A, the input data 114 describes a filled path 706 that is defined by a boundary 708. The filled path 706 is only editable by modifying the boundary 708. The stroked path module 110 receives the input data 114 and processes the input data 114 to generate a medial axis 710 for the filled path 706 by performing a medial axis transform on the boundary 708. The stroked path module 110 estimates a stroke width using the boundary 708 and the medial axis 710 and generates a stroked path 712 based on the medial axis 710 and the stroke width. The stroked path 712 is visually similar to the filled path 706 and the stroked path 712 is easily editable via manipulation of an editable path.

In the representation 702, the input data 114 describes a filled path 714 which is defined by a boundary 716. For example, the filled path 714 is converted from a stroked path and path information from the stroked path is no longer available in the filled path 714. The stroked path module 110 receives and processes the input data 114 to generate a medial axis 718 for the filled path 714 by performing a medial axis transform on the boundary 716. The stroked path module 110 estimates a stroke width using the boundary 716 and the medial axis 718 and generates a stroked path 720 based on the medial axis 718 and the stroke width. As shown, the stroked path 720 is easily editable via manipulation of an editable path and also visually similar to the filled path 714.

In the representation 704 illustrated in FIG. 7C, the input data 114 describes a filled path 722 that is defined by a boundary 724. The stroked path module 110 processes the input data 114 to generate a medial axis 726. For instance, the stroked path module 110 generates the medial axis 726 by performing a medial axis transform on the boundary 724. The stroked path module 110 also estimates a stroke width using the medial axis 726 and the boundary 724 and generates a stroked path 728 based on the medial axis 726 and the stroke width. For example, the stroked path 728 is easily editable by manipulating an editable path and the stroked path 728 is visually similar to the filled path 722.

Example System and Device

Figure 8:
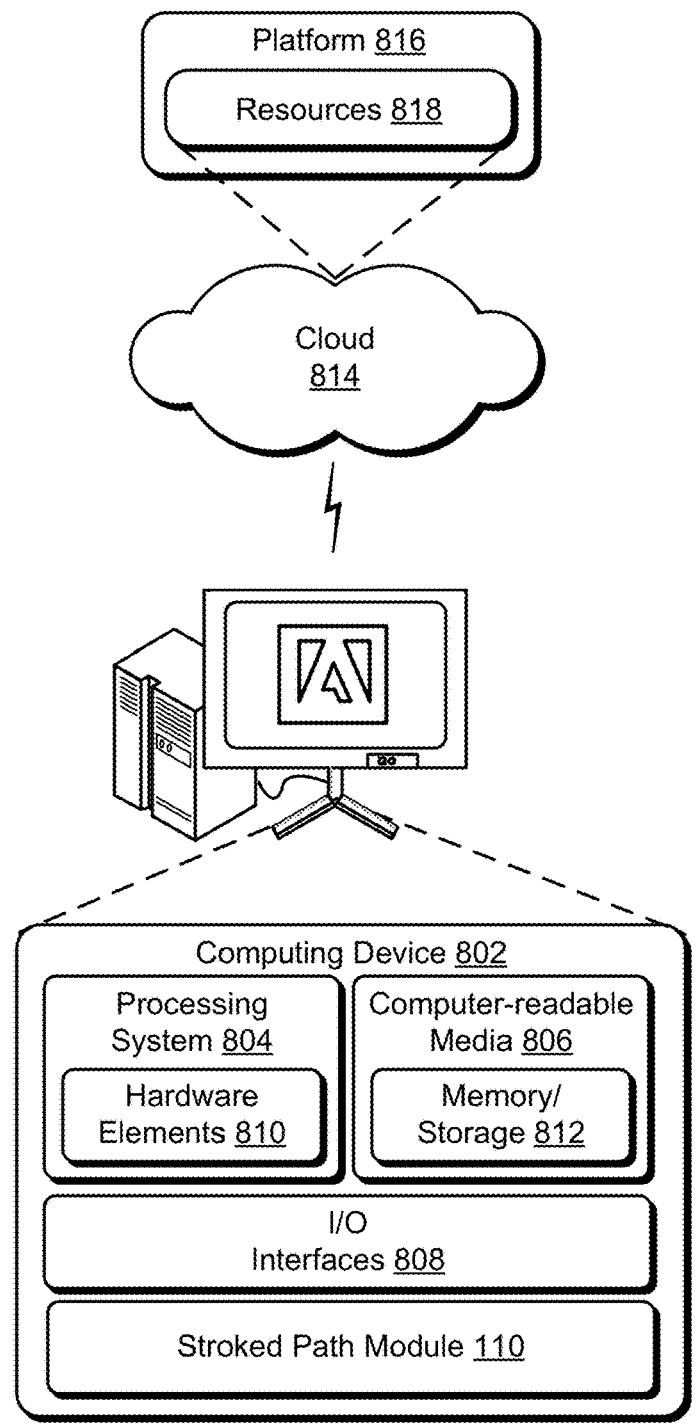
FIG. 8 illustrates an example system that includes an example computing device that is representative of one or more computing systems and/or devices for implementing the various techniques described herein.

FIG. 8 illustrates an example system 800 that includes an example computing device that is representative of one or more computing systems and/or devices that are usable to implement the various techniques described herein. This is illustrated through inclusion of the stroked path module 110. The computing device 802 includes, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that are configured as processors, functional blocks, and so forth. This includes example implementations in hardware as an application specific integrated circuit or other logic device formed using one or more semiconductors. The hardware elements 810 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 806 is illustrated as including memory/storage 812. The memory/storage 812 represents memory/storage capacity associated with one or more computer-readable media. In one example, the memory/storage 812 includes volatile media (such as random access memory (RAM)) and/or nonvolatile media (such as read only memory (ROM), Flash memory, optical disks, magnetic disks, and so forth). In another example, the memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 810. For example, the computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supportable by various configurations of the computing device 802 and are not limited to the specific examples of the techniques described herein. This functionality is also implementable entirely or partially through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. For example, the resources 818 include applications and/or data that are utilized while computer processing is executed on servers that are remote from the computing device 802. In some examples, the resources 818 also include services provided over the Internet and/or through a subscriber network, such as a cellular or Wi-Fi network.

The platform 816 abstracts the resources 818 and functions to connect the computing device 802 with other computing devices. In some examples, the platform 816 also serves to abstract scaling of resources to provide a corresponding level of scale to encountered demand for the resources that are implemented via the platform. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

CONCLUSION

Although implementations of systems for generating stroked paths have been described in language specific to structural features and/or methods, it is to be understood that the appended claims are not necessarily limited to the specific features or methods described. Rather, the specific features and methods are disclosed as example implementations of systems for generating stroked paths, and other equivalent features and methods are intended to be within the scope of the appended claims. Further, various different examples are described and it is to be appreciated that each described example is implementable independently or in connection with one or more other described examples.

What is claimed is:

1. A method comprising:
receiving, by a processing device, input data describing a vector object having a filled path;
generating, by the processing device, a medial axis for the filled path by performing a medial axis transform on a boundary of the filled path;
estimating, by the processing device, a stroke width based on distances between the medial axis and the boundary of the filled path that are normal to the medial axis;
generating, by the processing device, a candidate stroked path having a stroke attribute and identifying the stroke attribute by comparing the candidate stroked path with the filled path by:
rasterizing the filled path;
rasterizing the candidate stroked path; and
computing a loss between the rasterized filled path and the rasterized candidate stroked path;
generating, by the processing device, an initial stroked path having a first number of anchor points; and generating, by the processing device for display in a user interface, a stroked path that is visually similar to the filled path based on the medial axis, the stroke width, and the stroke attribute by optimizing the initial stroked path to reduce the first number of anchor points, the stroked path having a second number of anchor points that is less than the first number of anchor points.

2. The method as described in claim 1, wherein the stroke width is a variable stroke width.

3. The method as described in claim 1, wherein the stroke width is a uniform stroke width that is estimated based on a mode of the distances between the medial axis and the boundary of the filled path.

4. The method as described in claim 1, wherein the stroke attribute is a type of cap, a type of join, or a type of dash.

5. The method as described in claim 1, wherein the stroked path includes the stroke attribute.

6. The method as described in claim 1, further comprising:
segmenting the boundary of the filled path into boundary segments that are disconnected from the medial axis to estimate the stroke width; and
connecting the boundary segments as part of generating the stroked path.

7. The method as described in claim 1, wherein the filled path is a glyph of a font.

8. The method of claim 1, wherein performing the medial axis transform on the boundary of the filled path includes:
flattening the boundary into linear segments;
identifying points within the boundary that are disposed an equal distance from two of the linear segments; and
connecting the identified points.

9. A system comprising:
a memory component; and
a processing device coupled to the memory component, the processing device to perform operations comprising:
receiving input data describing a vector object having a filled path;
generating a medial axis for the filled path by performing a medial axis transform on a boundary of the filled path;
estimating a stroke width based on distances between the medial axis and the boundary of the filled path that are normal to the medial axis;
generating a candidate stroked path having a stroke attribute;
identifying the stroke attribute by comparing the candidate stroked path with the filled path by:
rasterizing the filled path;
rasterizing the candidate stroked path; and
computing a loss between the rasterized filled path and the rasterized candidate stroked path;
generating an initial stroked path having a first number of anchor points; and
generating, for display in a user interface, a stroked path that is visually similar to the filled path based on the medial axis, the stroke width, and the stroke attribute by optimizing the initial stroked path to reduce the first number of anchor points to generate a stroked path, the stroked path having a second number of anchor points that is less than the first number of anchor points.

10. The system as described in claim 9, wherein the stroke attribute is a type of cap, a type of join, or a type of dash.

11. The system as described in claim 9, wherein the stroke width is a variable stroke width.

12. The system as described in claim 9, wherein the stroke width is a uniform stroke width that is estimated based on a mode of the distances between the medial axis and the boundary of the filled path.

13. The system of claim 9, wherein performing the medial axis transform on the boundary of the filled path includes:
flattening the boundary into linear segments;
identifying points within the boundary that are disposed an equal distance from two of the linear segments; and
connecting the identified points.

14. The system of claim 9, further configured to:
segment the boundary of the filled path into boundary segments that are disconnected from the medial axis to estimate the stroke width; and
connect the boundary segments as part of generating the stroked path.

15. A non-transitory computer-readable storage medium storing executable instructions, which when executed by a processing device, cause the processing device to perform operations comprising:
receiving input data describing a vector object having a filled path;
generating a medial axis for the filled path by performing a medial axis transform on a boundary of the filled path;
estimating a stroke width based on distances between the medial axis and the boundary of the filled path that are normal to the medial axis;
identifying a stroke attribute by comparing a candidate stroked path with the filled path by:
rasterizing the filled path;
rasterizing the candidate stroked path; and
computing a loss between the rasterized filled path and the rasterized candidate stroked path;
generating an initial stroked path having a first number of anchor points; and
generating, for display in a user interface, a stroked path that is visually similar to the filled path based on the medial axis, the stroke width, and the stroke attribute by optimizing the initial stroked path to reduce the first number of anchor points to generate a stroked path, the stroked path having a second number of anchor points that is less than the first number of anchor points.

16. The non-transitory computer-readable storage medium of claim 15, wherein the operations further include:
segmenting the boundary of the filled path into boundary segments that are disconnected from the medial axis to estimate the stroke width; and
connecting the boundary segments as part of generating the stroked path.

17. The non-transitory computer-readable storage medium of claim 15, wherein the candidate stroked path includes the stroke attribute.

18. The non-transitory computer-readable storage medium of claim 15, wherein the stroke attribute is a type of cap, a type of join, or a type of dash.

19. The non-transitory computer-readable storage medium of claim 15, wherein the filled path is a glyph of a font.

20. The non-transitory computer-readable storage medium of claim 15, wherein performing the medial axis transform on the boundary of the filled path includes:
flattening the boundary into linear segments;
identifying points within the boundary that are disposed an equal distance from two of the linear segments; and
connecting the identified points.

* * * * *